United States Patent [19]

Bellows

[11] Patent Number: 4,937,001

[45] Date of Patent: Jun. 26, 1990

[54] PROCESS FOR REDUCING AXIAL DISPERSION IN A MAGNETICALLY STABILIZED FLUIDIZED BED

[75] Inventor: Richard J. Bellows, Hampton, N.J.

[73] Assignee: Exxon Research and Engineering Company, Florham Park, N.J.

[21] Appl. No.: 275,098

[22] Filed: Nov. 22, 1988

[51] Int. Cl.$^5$ .............................................. B01D 15/08
[52] U.S. Cl. ..................................... 210/661; 210/695
[58] Field of Search ...................... 55/3; 423/DIG. 16; 34/1, 10, 58; 210/656, 695, 661, 679

[56] References Cited

U.S. PATENT DOCUMENTS

| | | | |
|---|---|---|---|
| 4,143,469 | 3/1979 | Kamholz | 34/1 |
| 4,261,109 | 4/1981 | Mikus et al. | 34/1 |
| 4,272,893 | 6/1981 | Levenspiel et al. | 34/1 |
| 4,292,171 | 9/1981 | Mayer et al. | 208/164 |
| 4,443,231 | 4/1984 | Siegell | 55/3 |
| 4,565,793 | 1/1986 | Rosensweig | 502/74 |

*Primary Examiner*—Frank Spear
*Attorney, Agent, or Firm*—J. J. Mahon

[57] ABSTRACT

There is disclosed a process for stably fluidizing a magnetically stabilized bed by periodically removing and reapplying the magnetic field whereby axial dispersion and the width and length of channels between solid material are substantially reduced.

4 Claims, No Drawings

PROCESS FOR REDUCING AXIAL DISPERSION IN A MAGNETICALLY STABILIZED FLUIDIZED BED

This invention relates to improvements in the operation of magnetically stabilized fluidized beds. More particularly, this invention relates to a method for reducing the tendency of liquid fluidized magnetically stabilized beds to undergo excessive axial dispersion.

Fluidized beds containing magnetizable particles which are stabilized by an external magnetic force field have been well known in the art, and a number of uses for such beds have been disclosed. U.S. Pat. No. 4,292,171 issued Sept. 21, 1981 to Mayer et al. discloses the use of such beds in a hydrocarbon conversion process such as reforming; U.S. Pat. No. 4,565,793 issued Jan. 21, 1986 to Rosensweig discloses fluidized beds wherein the magnetic field is applied in a uniform manner and oriented parallel with the direction of fluid flow; U.S. Pat. No. 4,261,109 issued Apr. 14, 1981 to Mikus et al. discloses a process and apparatus for monitoring the behavior based on an observation of the magnetic field fluctuations in the bed; and U.S. Pat. No. 4,443,231, issued Apr. 17, 1984 to Siegell discloses the use of magnetically stabilized fluidized beds to separate the components of a multicomponent feed.

U.S. Pat. No. 4,143,469 issued to Kamholz on Mar. 13, 1978 and 4,272,893 (a division of U.S. Pat. No. 4,143,469) issued to Levenspiel et al. on June 16, 1987, do disclose the use of an intermittent magnetic field in a gas fluidized magnetically stabilized fluidized bed, however the purpose of removing and reapplying the field is to provide a bed where undesirable thermal gradients are minimized. This is considered distinguished from the present invention which deals with the problem of channeling in liquid fluidized magnetically stabilized beds.

In accordance with the present invention there has been discovered a process for stably fluidizing a bed containing solid particulate magnetizable, fluidizable material which is fluidized by a liquid stream where the improvement comprises reducing axial dispersion and channeling in the bed by periodically removing and reapplying the magnetic field whereby the width and length of channels between the solid material in the bed is substantially reduced.

In the operation of magnetically stabilized fluidized beds, the principal function of the applied external magnetic field is to stabilize the bed. The solid particulate magnetizable particles, upon application of the magnetic field, tend to become aligned in chain structures and this tendency toward chaining of the particles has been found to be directly proportional to the strength of the applied field. The action of the liquid fluidizing stream, which is passed through a column containing the magnetizable particles in order to fluidize the bed, does have a local orientation effect upon the particle structure in the bed. As the velocity of the liquid flow is increased, open channels of varying size appear between chains of particles. The problem of channeling is peculiar to liquid phase fluidized beds. Contacting, as measured by axial dispersion, is reduced as a result thereof, and such excessive channeling is undesirable when magnetically stabilized beds are used in processes such as adsorption because of the reduced contacting efficiency.

In the present invention, it has been found that intermittent interruption of the magnetic field temporarily destabilizes the bed so that a localized random motion of the composite particles will occur. This magnetic field interruption for about 0.1 to 1 second is brief enough to limit the randomization of the bed structure to localized mixing and the bed structure does not expand which would lead to increased voidage and channeling and substantial solids backmixing. When the application of the magnetic field is resumed, it is observed that the bed structure is more uniform with a noted decrease in channeling. Use of the intermittent magnetic field reduces the length and width of the channels between the chained particles and tends to eliminate the relatively large channels.

Generally speaking, the time interval between interruptions of the magnetic field will be about 15 to 120 seconds with the period of interruption of the field being about 0.1 to 1 second.

The advantages of the invention were demonstrated by measuring axial dispersion in a 101 cm. counter-current magnetically stabilized bed column which contained 60/80 mesh stainless steel pellets with water as the fluidizing liquid. The minimum fluidization velocity for these pellets was 0.75 cm/s.

The axial dispersion experiment involved injecting a dye tracer pulse into the bottom of the magnetically stabilized fluidized bed and recording the residence time of the effluent dye tracer pulse. The mean residence time and variance of the residence time were calculated from the residence time distribution. The axial dispersion and inverse Peclet number were then calculated. The axial dispersion numbers expressed below were calculated from a fixed bed model because the non-porous nature of the stainless steel particles rendered certain terms of the counter-current bed model meaningless.

Axial dispersion is measured as a dimensionless inverse Peclet Number given by the expression:

$$Pe^{-1} = D_{ax}/V_r D_p$$

where
$Pe^{-1}$ = Dimensionless Peclet Number
$D_{ax}$ = Axial Dispersion Coefficient
$V_r$ = Relative liquid interstitial velocity
$D_p$ = Diameter of ferromagnetic pellet.

Tabulated below in Table 1 are comparative measurements of axial dispersion in the column referred to above which compare a steady magnetic field operation with an intermittent magnetic field operation. The $Pe^{-1}$ (Peclet Number) was decreased by 2-4 times in the first three comparisons. In the fourth case, severe channeling occurred, but intermittent field application showed a 10 fold improvement in axial dispersion. When operated in the intermittent mode, the field was applied for 15 seconds and turned off for 0.3 seconds.

TABLE 1

| $Pe^{-1}$ Values | | | |
|---|---|---|---|
| Steady | Intermittent | Applied Field (Oersted) | Interstitial Fluid Velocity (cm/s) |
| 101 | 25 | 25 | 1.6 |
| 117 | 43 | 32 | 1.65 |
| 44 | 14 | 30 | 1.25 |
| 791 | 71 | 40 | 2.15 |

Lower $Pe^{-1}$ is desirable, because it indicates a closer approach to liquid plug flow through the bed. The effluent dye tracer was typically changed from a long "broad-tailed" peak to a sharper and narrower peak when the magnetic field was changed from steady to intermittent. This change indicates more efficient solid-liquid contacting with less liquid backmixing. (Liquid backmixing is caused by non-uniform liquid flow through channels in the bed.) The 3-4 fold reduction in axial dispersion could reduce the required height of an MSB adsorption bed by as much as 3-4 fold in cases where axial dispersion effects are larger than diffusional mass transfer effects in the adsorption bed.

The present invention is generally applicable to magnetically stabilized fluidized beds. The magnetically stabilized fluidized bed has been described as a quiescent, fluid-like bed which is totally free of bubbles or pulsations and which results when a uniform magnetic field is applied to a bed of magnetizable solids in a direction colinear with the flow of the fluidizing fluid. As such, magnetic stabilization produces a non-bubbling fluid state having a wide range of operating velocities between a lower limit given by the normal minimum fluidization superficial fluid velocity (Umf) required to fluidize or levitate the bed of solids in the absence of the magnetic field and an upper limit given by the superficial fluid velocity ($U_T$) required to cause time varying fluctuations of pressure difference through the stabilized fluidized bed portion during continuous fluidization in the presence of an applied magnetic field. The bed may also be operated within a narrower range substantially near the locus of transition between the bubbling and stabilized regimes of the bed as described for countercurrent magnetically stabilized beds in U.S. Pat. No. 4,247,987. The fluidity of magnetically stabilized bed continuously decreases from the fluidity of $U_T$ as the magnetic field is increased above, or the superficial fluid velocity is decreased below, the value at $U_T$. Transverse flowing stabilized beds which are operated further away from $U_T$ exhibit essentially plus flow, i.e., essentially a flat velocity profile. In contrast, transverse flowing stabilized beds which are operated close to $U_T$ exhibit a non plug flow solids velocity profile in the vertical direction and have increased fluidity. However, deviations from a plug flow profile when the beds are operated in the more fluid region may be reduced or substantially eliminated by proper design or solids flow weir at the bed exit. Plug flow conditions are preferred for the practice of the present invention.

Magnetically stabilized fluidized beds have the appearance of expanded fixed beds with essentially no gross solids backmixing and essentially no fluid bypassing. The application of the magnetic field allows superficial fluid flow rates of 10 or more times the flow rate of the fluidized bed at incipient fluidization in the absence of the magnetic fluid, along with the substantial absence of gross solids backmixing and fluid bypassing such as bubbling in gas fluidized beds and roll-cell behavior in liquid fluidized beds. As the superficial fluid velocity is increased, the pressure drop through the bed is similar to that which would be expected from a normal fluidized bed not subjected to an applied magnetic field - the pressure drop increases to a value corresponding to the ratio of bed weight to cross sectional area at the minimum fluidization velocity, and then remains relatively constant as the fluid velocity is increased. This stably fluidized bed condition persists even as the solids are continuously added to and removed from the column.

The magnetically stabilized fluidized bed (MSB) thus described combines in one system the principal advantages of both fluidized bed and fixed bed reactor systems as is summarized in Table 2 below.

TABLE 2

|  | Fluid Bed | MSB | Fixed Bed |
| --- | --- | --- | --- |
| Small particle size with low pressure drop | yes | yes | no |
| Absence of fluid bypassing | no | yes | yes |
| Continuous solids throughput | yes | yes | no |
| Avoids solids backmixing | no | yes | yes |
| Avoids entrainment from bed | no | yes | yes |

As an example of the advantage of a magnetically stabilized bed, the use of small particle size reduced diffusional resistance within a bed particle such that the particle can be used more effectively. At the same time, both high pressure drop due to the use of small particles and gross fluid bypassing are eliminated. The use of small particles in the sorption process permits a faster transfer of the sorbed species from the fluid than do larger adsorbent particles, thereby enabling a faster approach to equilibrium. An additional advantage is that the solids can be added to and removed from the bed, and that back-mixing of solids in the bed will be minimized or eliminated such that said solids move in a plug flow manner from near the point of introduction to near the point of withdrawal.

For economy, it is desirable that the bed solids achieve sufficient magnetization to stabilize the bed at a relatively small intensity of applied magnetic field. When ferromagnetic particles are placed in the magnetic field, the induced magnetization is a function of the magnetic material, the geometry of the bed, as is described in U.S. Pat. No. 4,247,987.

Conventional permanent magnets, electromagnets or both can be employed to provide the magnetic field. The electromagnets may be energized by alternating or direct current, although direct current energized magnetic fields are preferred. When powered by direct current with the use of solid state control or a transformer/rectifier, electromagnets are particularly desirable for applying a magnetic field to the bed particles and provide an excellent method of stabilizing the fluidization of the bed particles in response to the flow of the carrier fluid.

The invention is not limited by the shape or positioning of the magnet employed to produce an externally applied magnetic field. The magnet can be of any size, strength or shape and can be placed above or below the bed depending upon the solids used, the degree of stabilization required and the like. The magnets can be placed within or outside the contacting vessel and may even be employed as an integral portion of the vessel structure. The process is not limited to any particular vessel or vessel material and it can be readily adapted for use in contacting vessels currently employed by industry. In a preferred embodiment of the present invention, a solenoidal shaped electromagnet is employed to surround the fluidized bed as this provides the most uniform magnetic field and consequently the best stability throughout the bed.

With proper selection of magnetic particles, the power requirement for the electromagnet field source in commercial plants will be modest. Magnetic power dissipation generates heat that may be removed using natural convection air cooling. This eliminates any need for liquid convection cooling and attendant requirements for coolant treatment and recirculation. The magnetic field source may be computer designed with high confidence to yield an applied magnetic field having a specified intensity and uniformity.

The strength of the magnetic field to be applied to the fluidized solids in the contacting zone will depend on the magnetization of the magnetizable particles and the degree of stabilization desired. Particles having relatively weak magnetic properties, e.g., some composites and alloys, will require the application of a stronger magnetic field than particulate solids having strong magnetic properties, e.g., iron, to achieve similar stabilization effects. The size and shape of the solids will also have an effect on the strength of the magnetic field to be employed. The magnetization of the particles should not be sufficient to cause excessive particle to particle attractive forces and agglomeration which would tend to freeze or lock the particles in the bed and present continuous operation. However, since the strength of the field produced by an electromagnet depends on the current strength of the electromagnet, an operator can readily adjust the field strength to achieve the desired degree of stabilization for the particle system employed.

Typically, the applied magnetic field for an empty vessel will range from about 5 to about 1500 Oersteds, preferably from about 10 to about 1000 Oersteds.

The term "solid, particulate magnetizable material" applies generally to solid particles containing all ferromagnetic and ferrimagnetic substances, including, but not limited to, magnetic $Fe_3O_4$, $Fe_2O_3$, ferrites of the form $MO \cdot Fe_2O_3$ wherein M is a metal or mixture of metals such as Zn, Mn, Cu and the like, as well as ferromagnetic elements including iron, nickel, cobalt and gadolinium. In the operation of such beds, the magnetizable solids are typically admixed with adsorbents such as activated aluminas, silicas, silica gels, zeolites, ion-exchange media and resins, since a principal use of the magnetically stabilized beds is in adsorbent separation of components of a liquid mixture. Typically such mixtures will contain about 10 to 75 weight % magnetizable component. The magnetizable solids will generally range in particle size from about 0.001 mm. to about 50 mm., preferably from about 0.05 mm. to about 1.0 mm.

The present invention is particularly applicable to a magnetically stabilized bed wherein the flow of solids is countercurrent to an upwardly flowing liquid fluidizing stream, the column having means at the bottom for introduction of the fluidizing liquid and removal of circulating solids and means at the top, or at the top and at the mid-point of the column, for removal of liquid and introduction of solids. The invention is also generally applicable to a bed where the flow of solid and liquids are counter-current to each other, i.e., the solids may flow upwardly, downwardly or tranversely and the liquid flow is counter-current to the direction of the solids flow.

What is claimed is:

1. In a process for stably fluidizing a bed containing solid particulate magnetizable, fluidizable material within an external magnetic force field, wherein the bed of fluidizable material is fluidized by a liquid stream, the improvement which comprises reducing axial dispersion by periodically removing and reapplying the magnetic field whereby the width and length of channels between the solid material is substantially reduced.

2. The process of claim 1 wherein the magnetic field is removed for a period of about 0.1 to 1 second.

3. The process of claim 1 wherein the liquid and solids flow counter-currently.

4. The process of claim 3 wherein the liquid stream flows upwardly.

* * * * *